(12) United States Patent
Tang

(10) Patent No.: US 9,202,520 B1
(45) Date of Patent: Dec. 1, 2015

(54) SYSTEMS AND METHODS FOR DETERMINING CONTENT PREFERENCES BASED ON VOCAL UTTERANCES AND/OR MOVEMENT BY A USER

(71) Applicant: Amazon Technologies, Inc., Reno, NV (US)

(72) Inventor: Joshua K. Tang, San Luis Obispo, CA (US)

(73) Assignee: Amazon Technologies, Inc., Reno, NV (US)

( * ) Notice: Subject to any disclaimer, the term of this patent is extended or adjusted under 35 U.S.C. 154(b) by 409 days.

(21) Appl. No.: 13/654,066

(22) Filed: Oct. 17, 2012

(51) Int. Cl.
*H04N 9/47* (2006.01)
*G11B 27/00* (2006.01)
*G10L 15/24* (2013.01)

(52) U.S. Cl.
CPC ............... *G11B 27/00* (2013.01); *G10L 15/24* (2013.01)

(58) Field of Classification Search
CPC ....... G06N 99/005; G06N 5/048; G11B 27/00
USPC ........................................................... 348/77
IPC ...................................................... G10H 1/36
See application file for complete search history.

(56) References Cited

U.S. PATENT DOCUMENTS

| | | | | |
|---|---|---|---|---|
| 4,400,788 A * | 8/1983 | Myers et al. | ................... | 704/241 |
| 6,028,626 A * | 2/2000 | Aviv | ............................... | 348/152 |
| 6,956,955 B1 * | 10/2005 | Brungart | ....................... | 381/310 |
| 8,543,395 B2 * | 9/2013 | Todic | ............................ | 704/235 |
| 8,676,904 B2 * | 3/2014 | Lindahl | ......................... | 709/206 |
| 8,798,326 B2 * | 8/2014 | Togawa | ......................... | 382/107 |
| 2003/0225582 A1 * | 12/2003 | Fujiwara et al. | .............. | 704/270 |
| 2012/0035927 A1 * | 2/2012 | Yamada et al. | ............... | 704/242 |
| 2012/0278358 A1 * | 11/2012 | Watanabe et al. | ............. | 707/769 |
| 2013/0238341 A1 * | 9/2013 | You | ............................... | 704/275 |

FOREIGN PATENT DOCUMENTS

WO   WO 2010136722 A1 *  12/2010   ........................ 25/78

* cited by examiner

*Primary Examiner* — Andy Rao
*Assistant Examiner* — Masum Billah
(74) *Attorney, Agent, or Firm* — Sutherland Asbill & Brennan LLP

(57) ABSTRACT

This disclosure relates to systems and methods for determining when a user likes a piece of content based, at least in part, on analyzing user responses to the content. In one embodiment, the user's response may be monitored by audio and motion detection devices to determine when the user's vocals or movements are emulating the content. When the user's emulation exceeds a threshold amount the content may be designated as "liked." In certain instances, a similar piece of content may be selected to play when the current content is finished.

31 Claims, 8 Drawing Sheets

SYSTEMS AND METHODS FOR DETERMINING CONTENT PREFERENCES BASED ON VOCAL UTTERANCES AND/OR MOVEMENT BY A USER

BACKGROUND

Content consumers may have a wide variety of likes and dislikes regarding the types of content they want to consume. Consumers may arrange their content into playlists to organize their content for specific instances or moods. In certain instances, the consumer may indicate their favorite content and may arrange the favorite content into a playlist. However, when the content is consumed on a random basis (e.g., not on a playlist), the next song is less likely to be consistent with previous song. In this instance, the consumer may not be able to select a similar song without accessing their content device and manually selecting another song or a playlist of similar songs.

Figure 1:
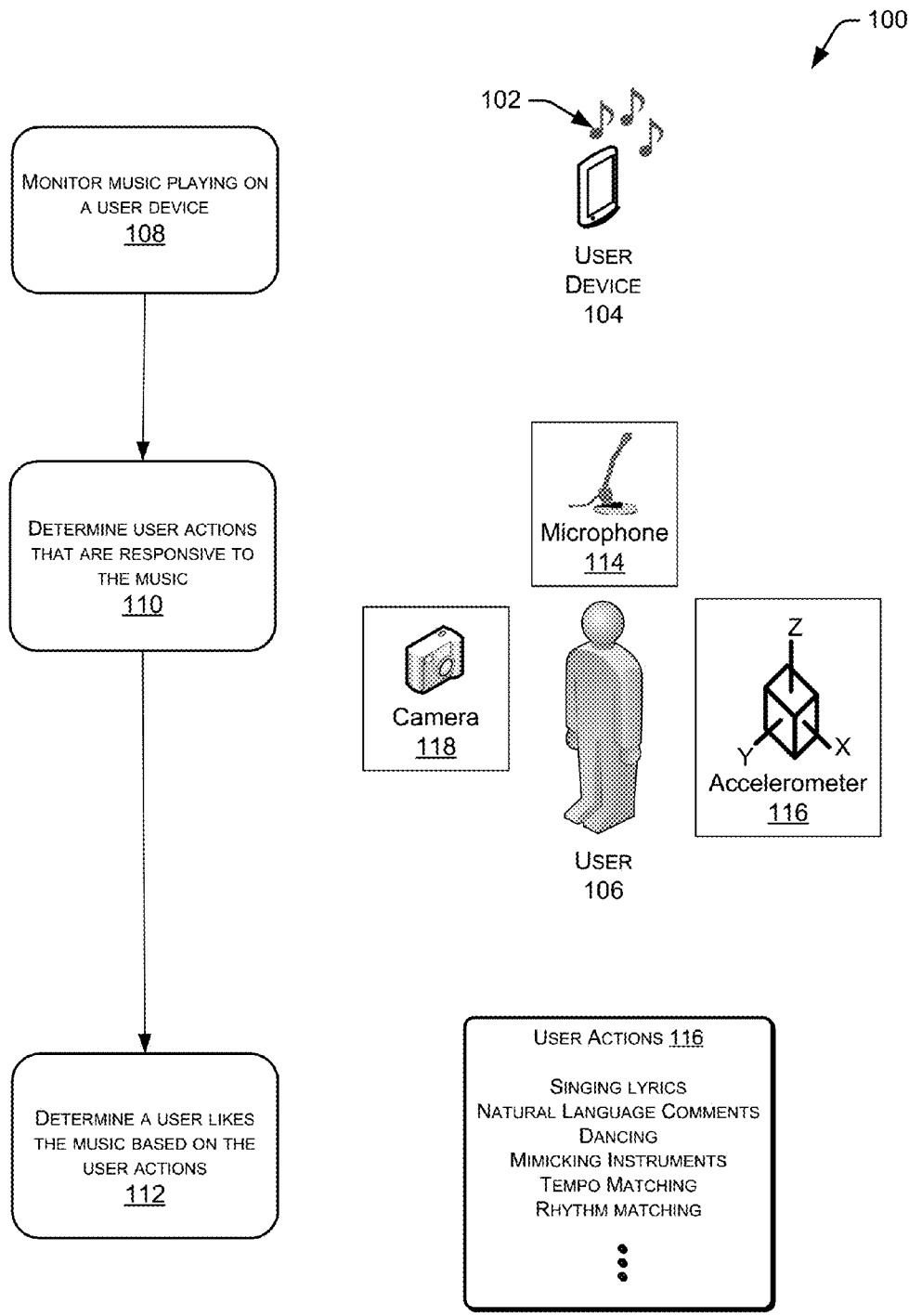
FIG. 1 illustrates a flow diagram for a method for determining when a user likes content based on detecting user vocal utterances or movements in accordance with one or more embodiments of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Described herein are systems and methods for determining when a user likes a piece of content based, at least in part, on their vocal utterances or body movement. In one embodiment, the content may be a song that includes lyrics, a melody, a tempo, or a rhythm. A system may analyze the components of the song to generate a signature for each of the components that may be compared with user vocal utterances and/or user movement. Broadly, user vocal utterances may include any sound generated by the mouth or vocal chords. The user vocal utterances may include, but are not limited to, singing, speaking, humming, chanting, scatting, or vocal percussion sounds. User movements may pertain to any type of body movement which may include, but is not limited to, arm movement, leg movement, torso movement, or head movement.

The system may determine whether the user vocal utterances and/or user movements are related to the lyrics, the melody, the tempo, and/or the rhythm of the song. In one embodiment, the system may include a microphone to capture the user's vocal utterances. The system may identify the words and the vocal melody associated with the lyrics and compare the user's vocal sounds (e.g., words, tones, etc.) to the words or vocal melody. When the vocal sounds match or are similar to the song's words or vocal melody the system may indicate that the user likes that song. In one embodiment, the system may select a similar song to play after the current song ends.

In another embodiment, the system may determine whether the vocal sounds are accurately portraying the song. For example, determining the user's words or phrases are consistent with the actual words and phrases used in the song. The system may rank the accuracy of the user's vocal utterance based, at least in part, on the how well the vocal utterances match the song. The higher the accuracy, the higher the likelihood that the user likes the song.

In another embodiment, the system may determine the quantity of the vocal sounds that are consistent with the song. This may include determining when the user sings a portion of or the entire chorus, verse, bridge, and/or the entire song. This may include attempts to vocalize the song that may not be a completely accurate rendition of the song. The higher the quantity of user interaction or performance, the higher the likelihood that the user likes the song.

In another embodiment, the system may determine the intensity of the vocal sounds of the song. This may include monitoring the decibel level of the user during their performance. The higher the decibel level, the higher the likelihood that the user likes the song.

The system may also capture the user's movements using an accelerometer and/or a camera when the song is playing. The user's movement may be related to the lyrics, the melody, the tempo, or the rhythm of the song. The accelerometer may detect the impact or force of the movement and any subsequent movements. The system may compare the accelerometer data with the components of the song to determine if the user is attempting to emulate at least one of the song components. In another embodiment, the camera may be used to detect the user movements and to compare the movements to the song components or determine if the user movements are related to dancing or some form of song emulation. For example, the user may head bobbing to the music while doing another activity (e.g., cooking, cleaning, using the computer, playing a game, etc.). The system may differentiate between different types of movement to determine (e.g., using the accelerometer or the camera) when at least one of the movements is emulating or mimicking a song component.

In one embodiment, the system may rank a song higher than other songs based, at least in part, on a combination of user vocal utterances and user movements that are detected during the song. For example, when a user emulates more than one aspect (e.g., lyrics, melody, tempo, and/or rhythm) of the song at the same time, the ranking of that song may be higher than other songs when the user emulated fewer aspects of the song at the same time.

ILLUSTRATIVE METHODS

FIG. 1 illustrates a flow diagram for a method 100 for determining when user actions are responsive to or emulating a song 102 being played by a user device 104 in proximity to a user 106. In this embodiment, the user device 104 may play the music and monitor the user actions to determine whether the user likes the song. However, in other embodiments, several devices may be involved in playing the music, detecting user actions, and determining whether the user actions are indication that the user likes the song.

At block 108, the user device 104 may play a song that may have been selected by the user or at random. The song may comprise lyrics, a melody, a tempo, and/or a rhythm. The lyrics may comprise one or more words that are sung or spoken within the song. The lyrics may be arranged into a vocal melody that associates one or more tones with the words or phrases of words in the song.

The melody may comprise tones arranged in a pattern that may be repeated throughout the song. In contrast to the vocal melody, the melody may apply to or be generated by musical instruments other than the voice of a singer.

The tempo may refer to the pace of the song that may be measured by the beats per minute. A metronome may be set to a beat per minute setting, in which the time between beats is similar over a period of time. However, the tempo may change one or more times within the song, but the tempo may be generally consistent between the instruments and the singer who are generating the instrumental or vocal melodies of the song. In certain instances, the tempo may be described by the time signature (e.g., 4/4, 3/4, 6/8) of the song that dictates the number of notes within a measure of music. The tempo indicates how fast those notes should be played within the measure of music.

The rhythm may comprise a patterned reoccurrence of a beat within the song that supports or interacts with the melody. However, the melody may also have a rhythmic aspect in addition to the tonal arrangement. In one specific embodiment, the rhythm or beat of the song may be highlighted by certain instruments (e.g., drums, bass guitar) that generate a groove or feel of the song. Although the rhythm may be played within the context of the tempo, the rhythm may be more dynamic than the tempo and may drive the feel of the song that may induce dancing or other user 106 actions (e.g., head bobbing, percussive vocal utterances).

At block 110, the user device 104 may determine the user's actions are responsive to the song being played. The user device 104 may use one or more detection devices to determine if the user 106 is emulating or mimicking the song. The detection devices may include, but are not limited to, a microphone 114, an accelerometer 116, and/or a camera 118.

The microphone 114 may be used to detect the user's 106 vocal utterances of the components of the song. The vocal utterances may include, but are not limited to, singing, spoken word, humming, and/or vocal percussion sounds. The microphone 114 may also detect other sounds that include, but are not limited to, a tapping foot, a tapping hand, snapping fingers, hand clapping, or any other sound related to dancing or body movement that is synchronized with one or more song components. Broadly, the user device 104 may be configured to detect and interpret any sound generated by the user 106 when the song is playing. In one specific embodiment, the microphone 114 may be an electrical device that converts a sound wave into an electrical signal that may be processed by the user device 104. Sound waves may be converted to electrical signals using several techniques or materials, which may include, but are not limited to, piezoelectric, electromagnetic induction, or lasers.

In another embodiment, the microphone 114 may also detect spoken words that may indicate whether the user 106 likes the song. For example, this may include, but is not limited to, "I like this song," "I love this song," and/or "This song is the best." In this embodiment, the spoken words may not be consistent with any of the song components. However, the user device 104 may be able to discern the meaning of the spoken words from the lyrics to determine the user 106 likes or dislikes the song.

The accelerometer(s) 116 may be used to detect the movements of the user 106 when the song is being played. In one embodiment, the accelerometer 116 may be an electro-mechanical device that measures acceleration of a mass that may be influenced by the user's 106 movement. The accelerometer 114 may be attached to the user 106 or may be adjacent to the user 106. In either instance, the accelerometer 114 may be close enough to detect the user's 106 movement directly or through vibrations that are generated by the user 106. Accelerometers 114 may include, but are not limited to, piezoelectric or capacitance materials that can detect movement and transform that movement into an electrical signal. The user device 104 may interpret the signal to determine the timing and intensity of the movement. The timing and/or intensity of the movement may be compared against the song components to determine if the user is emulating or mimicking the song components. If so, the emulation or mimicking may be an indication that the user 106 likes the song.

The camera 118 may also be used to detect the user's 106 movements to determine whether the user 106 is emulating the song's components. The camera 118 may include an optical system that captures the light reflected off a user 106 and converts the light to an electrical signal that the user device 104 may analyze. The user device 104 may use a vision algorithm to interpret the user's 106 movement and determine when the movement is synchronized with the song's components. The vision algorithm may also determine when the user is dancing, moving their feet, hands, head, and/or torso. The vision algorithm may also determine when the user is physically emulating the instruments that are played in the song. For example, mimicking guitars or drums or any other musical instrument that may be used in the song.

In one embodiment, the camera 118 may be used on its own to determine user 106 movements. However, in other embodiments, the camera 118 may be used in conjunction with the accelerometer 116 and/or the microphone 114 to determine the user's movement.

At block 112, the user device 104 may determine the user 106 likes the song based one or more user 104 actions that are detected by one or more detection devices (e.g., microphone 114, accelerometer 116, and/or camera 118). The user 106 actions may include, but are not limited to, singing, natural language comments, dancing, mimicking instruments, tempo matching, or rhythm matching. Determining whether a user likes the song will be discussed in greater detail in the description of the FIGS. 2-8 below.

Figure 2:
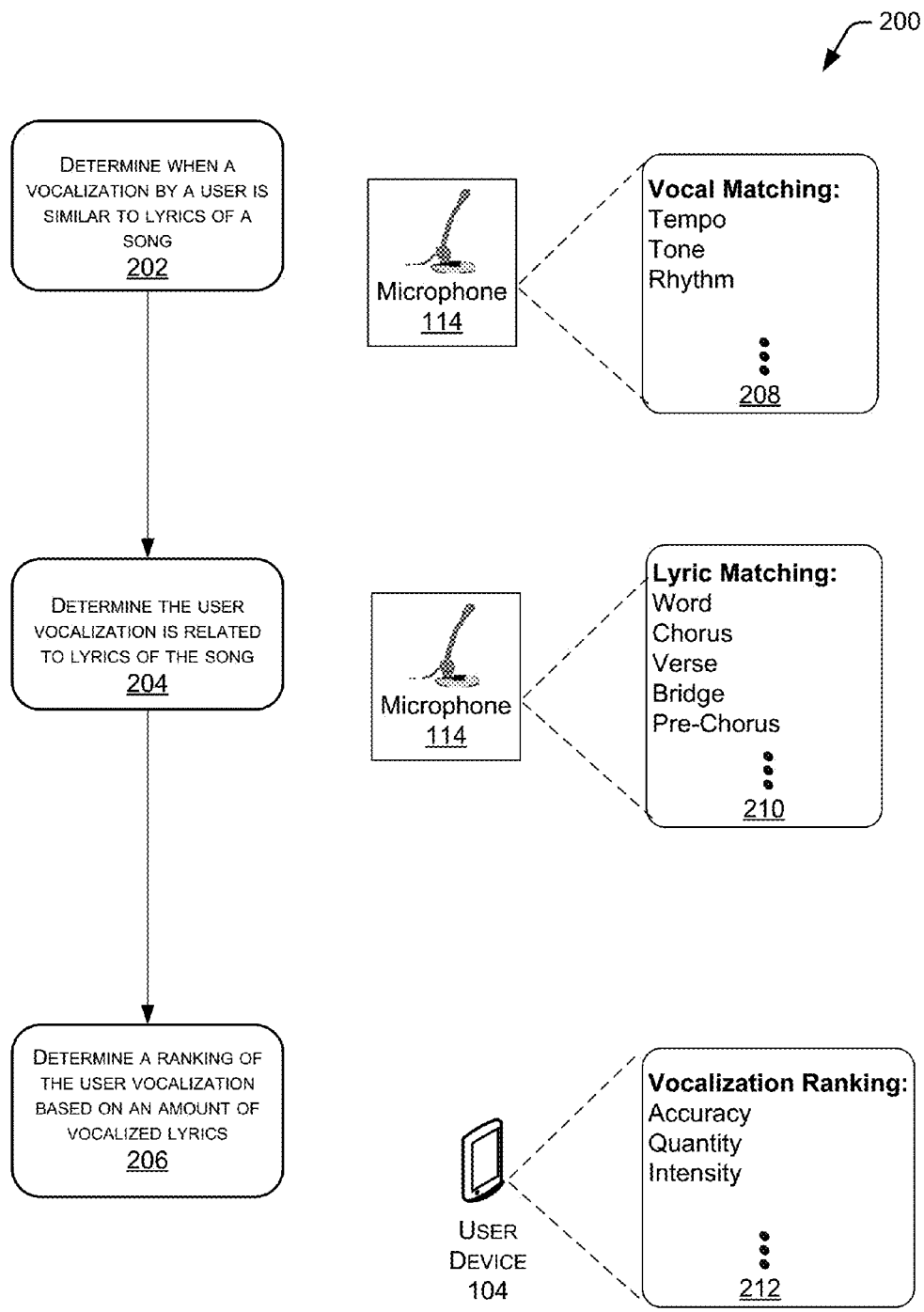
FIG. 2 illustrates a flow diagram for a method determining when a user likes content based on detecting user vocal utterances of lyrics of a song in accordance with one or more embodiments of the disclosure.

FIG. 2 illustrates a flow diagram for a method 200 determining when a user 106 likes a song based on detecting user vocal utterances of lyrics of a song. The user device 104 may use a microphone 114 to detect the user vocal utterances. As noted above, the user vocal utterance may include, but are not limited to, singing, spoken word, humming, and/or vocal percussion sounds. In one embodiment, the vocal utterance determination may focus on the words or lyrics of the song, but may also consider the lyrics within the context of the melodies, tempos, and/or rhythms of the song.

At block 202, the user device 104 may determine the user vocal utterances (e.g., singing, spoken word) are directed to or are similar to the song being played. The analysis may include comparing the tone of the words, the tempo, and/or the rhythm of the user vocal utterances, shown in block 208. For instance, the user device 104 may distinguish between the user having a phone conservation and an attempting to emulate or mimic the song through vocal utterances. In one embodiment, the user device 104 may compare the tempo of the song against the user's 106 vocal utterance tempo. The user device 104 may determine whether the beats per minute of the song similar to the pace or beats per minute of the user's vocal utterances. For example, when the song has a tempo of 180 beats per minute (bpm) the user device 104 may determine whether the user vocal utterances have a similar tempo (e.g., 180 bpm) or at least a harmonic of the song tempo (e.g., 30 bpm, 60 bpm, or 90 bpm). Accordingly, the user vocal utterance may not be required to be an exact match. In one specific embodiment, the user device 104 may establish a threshold amount that may allow the user vocal utterances to be slightly faster or slower than the song tempo or its harmonic values. For example, the threshold amount could +/−10%.

The user device 104 may also determine whether the tone of the user vocal utterances is similar to the vocal tones in the song. This may include comparing the vocal melody (e.g., tone and timing) of lyrics against the user vocal utterances. However, the user device 104 may not require an exact tone match to the song. The user vocal utterance tones may be similar to the song tones when they are offset from the song tones by a certain amount (e.g., a fourth, an octave). In another embodiment, the user vocal utterance tones may be similar to the song tones when the user 106 is completely off key. For example, when the user's 106 tone changes in a similar manner than the song tone, the user device 104 may determine the user vocal utterances are similar to the song's tone. When the song's tones change during a phrase from low to high and the user's 106 tone changes from a lower tone to a higher tone, despite being off key, the user device 104 may determine the user 106 may be attempting to emulate the song.

The user device 104 may also determine the rhythm of the user's 106 vocal utterances is similar to the vocal rhythm of the song. This determination may focus on the timing of the lyrics or when certain words are spoken or sung in the song. The user device 104 may analyze the rhythm or the cadence of the lyrics and compare that against the rhythm or cadence of the user's 106 vocal utterances. This may include, but is not limited to, analyzing the rhythm of the lyrics word for word, but the user 106 vocal utterances are not required to be fully formed words, the vocal utterances may be humming or other vocal sounds that mimic the rhythm or cadence of the lyrics.

At block 204, the user device 104 may compare the content of the user vocal utterances to the words of the song or the arrangement of the lyrics in the song, as shown in block 210. The user device may analyze each word separately to determine the accuracy of the user's vocal utterance. This may include a word for word comparison between the lyrics and the user's vocal utterances. In one embodiment, the user device 104 may determine how much of lyrics that user has vocalized. This may include determining when the user sings a portion of a song chorus or the entire chorus. This may also apply to other lyrical conventions, such as, but not limited to, a verse, a bridge, and/or a pre-chorus. In this way, the user device 104 may be able to quantify how much of the lyrics the user 106 is vocalizing.

At block 206, the user device 104 may rank the user's 106 vocal utterances based, at least in part, on the vocal matching described in block 202, the lyrics matching described in block 204, and/or the intensity of the vocal utterance, as shown in block 212. The intensity of the vocal utterances may be based on the decibel level of the user's 106 vocal utterances. The user device 104 may keep a history of the user's 106 decibel levels to determine when the intensity is above average, above the mean, or an outlier to the user's 106 prior vocal utterances. This history may also include the accuracy of the vocal matching and/or the lyric matching for individual songs. The historical data may be used create a profile that may indicate a user has a strong interest in the song relative to their prior performances during that song or other songs. Generally, the user device 104 may develop a baseline that may be used to determine when the user's 106 interest in the song is above average. For example, if a user 106 sings the words to every single song, the vocal matching or lyric matching may be given a lower weight. However, if the user 106 sings the song at a higher intensity than in the past, the user's vocal utterance may be given a higher weight based in the above average intensity.

In another embodiment, the user's 106 location may also play a role in the weighting the accuracy, quantity, or intensity. For example, the user 106 may be more likely to interact with the song in the privacy of their home or car rather than at work or the gym. The user may tap their foot when they are at work, but may sing or dance when they are at home. Therefore, the accuracy, quantity, and intensity of the user's response may vary based on location. The user device 104 may rank the vocal utterances or movements in view of the location to determine whether the vocal utterances or movements are higher or lower than prior vocal utterances and movements made at that location. The location of the user 106 may be determined by any location or geo-location techniques (e.g., global position system).

In summary, the ranking may be based on the accuracy, quantity, and intensity of the user vocal utterances of the lyrics. The ranking may be based on absolute values that when they exceed a threshold amount may be indication that the user 106 likes the song. In another embodiment, the ranking may be based on a user's historical performance for that song or other songs. When the accuracy, quantity, and/or intensity values exceed the historical baseline values, the user device 104 may determine the user likes that song.

Figure 3:
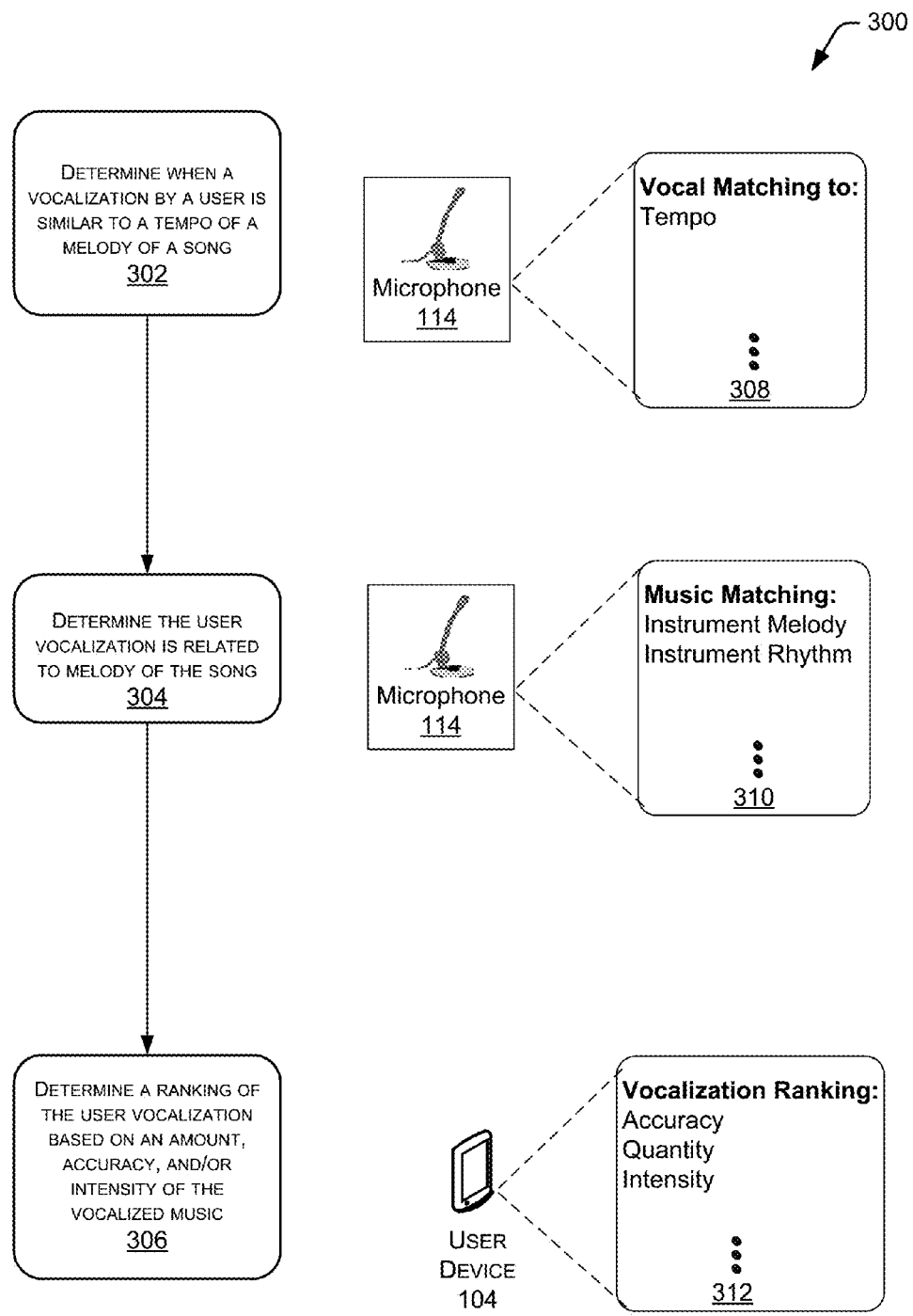
FIG. 3 illustrates a flow diagram for a method determining when a user likes content based on detecting user vocal utterances of an instrumental melody in accordance with one or more embodiments of the disclosure.

FIG. 3 illustrates a flow diagram for a method 300 determining a user 106 likes an song based on determining user 106 vocal utterances are similar to an instrumental melody of a song. The user device 104 may use a microphone 114 to detect the user vocal utterances. As noted above, the user vocal utterance may include, but are not limited to, singing, spoken word, humming, and/or vocal percussion sounds. In this embodiment, the vocal utterance determination may focus on the instrumental melody of the song within the context of the tempos and/or rhythms of the song.

At block 302, the user device 104 may determine the user's 106 vocal utterances are similar to an instrumental melody or an instrumental portion of the song. The analysis may include comparing the tempo of the user 106 to the tempo of the instrumental portions of the shown in block 208. In this embodiment, the user device 104 may have one or more instruments to analyze that are used during the song. In one specific embodiment, the song may include, but is not limited to, guitar, bass guitar, drums, piano or any other instrument or device that is adds a sound to the song. As noted above, the tempo may be an indication of the pace of the song and may be measured in beats per minute. Although the tempo may change during the song, the tempo is generally consistent for several measures of music.

In this embodiment, the user device 104 may compare the user's 106 vocal utterances across one or more instrumental melodies against one or more instruments. Generally, the instruments may be played at a common tempo, but certain instruments may be playing more notes between each beat. The faster instruments may give the appearance of using a faster tempo, but, in most cases, the tempo of the song is consistently applied to all instruments. The tempo comparison provides a quick indication of whether the user's vocal utterances are related to the song. Accordingly, the user device 104 may be able to determine the user 106 vocal utterances are related to any of the instruments without comparing them individually. The tempo of the user 106 vocal utterances may not need to match exactly, in some instances the user device 104 may allow for a deviation between the instrument tempo and the user's vocal utterances (e.g., +/−5%).

At block 304, the user device 104 may determine whether the user's 106 vocal utterances are related to one or more instrumental melodies in the song, as shown in block 310. The instrumental melodies may include different tones, arrangement of tones, and/or different rhythms with respect to each other. In one specific embodiment, the song may include a guitar melody, a bass guitar melody, and/or a piano melody. The user device 104 may compare the user's 106 vocal utterances against one or more of the instrumental melodies to determine when the user 106 may be attempting to emulate or mimic the song. The user device 104 may compare the tone and/or rhythm of the user's 106 vocal utterances against melody/tones and rhythm of the one or more instruments. In one instance, the user device 104 may do an initial check of the rhythm to determine whether the user's 106 vocal utterances are related to the melody's rhythm. When the rhythm matches, the user device 104 may compare the tones of the vocal utterances against the tones of the one or more instruments. In this instance, the rhythm and tones of the vocal utterances may both relate to one or more melodies in the song.

In another instance, the user device 104 may just compare the melody rhythms to determine if any relationship exists between the song and the vocal utterances. When the relationship of the rhythms are related to each other, the user device may determine the vocal utterances and the song are related without comparing the tones of the vocal utterances to the tones of the instruments.

At block 306, the user device 104 may determine a ranking of the user's 106 vocal utterances based, at least in part, on the accuracy, quantity, and/or intensity of the user's 106 vocal utterances of the song's melodies, as shown in block 312.

The accuracy may be based, at least in part, on the similarity of the vocal utterances to the song's melody as described above in blocks 302 and 304. The ranking may be higher for vocal utterances that more are more accurate to the song than for other vocal utterances that are less accurate to the melody of the song. Accuracy may be related to the tones individually and to the arrangement of tones that form the melody over a period of time.

The quantity may be based, at least in part, on the amount of vocal utterances that are related to the melody over a period of time. The quantity ranking may increase when the user at least makes an attempt to vocalize the melody for an extended period of time. Although the vocal utterances may not be completely accurate, the ranking may increase as along as the user device 104 determines the vocal attempt is related to the melody. In contrast, the quantity ranking score may be lower when the user attempts to vocalize the melody for small or limited period of time. For example, when the melody is played ten times within the song, the quantity score will be higher when the user attempts to vocalize the melody six times rather than a one-time attempt.

The intensity ranking may be based, at least in part, on the decibel level of the vocal utterance. The decibel level may be detected by the microphone 114 and the user device 104 may determine the decibel level based, at least in part, on that reading.

In summary, the ranking may be based on the accuracy, quantity, and intensity of the user vocal utterances of the melody. The ranking may be based on absolute values that when they exceed a threshold amount may be indication that the user 106 likes the song. In another embodiment, the ranking may be based on a user's historical performance for that song or other songs. In another embodiment, the location of the user 106 may also be considered when weighting the user's historical performance. When the accuracy, quantity, and/or intensity values exceed the historical baseline values, the user device 104 may determine the user likes that song.

Figure 4:
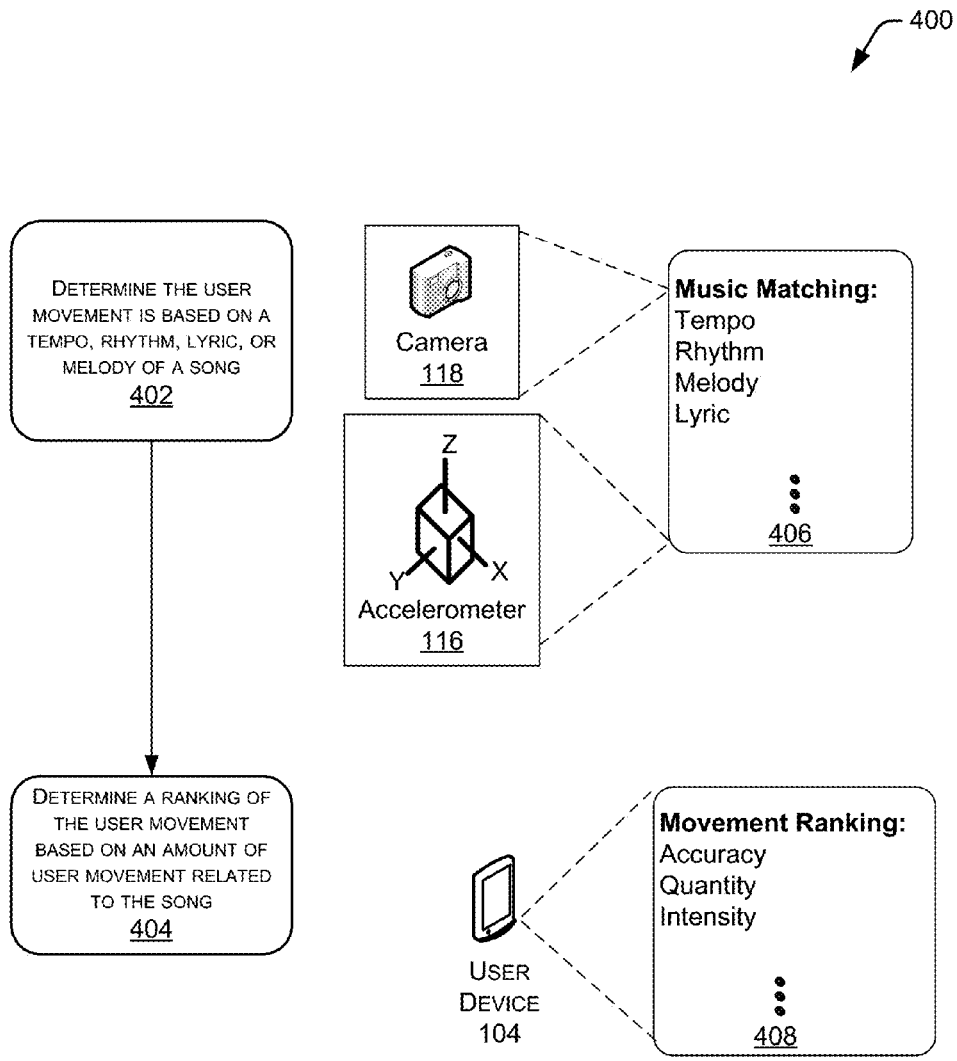
FIG. 4 illustrates a flow diagram for a method determining when a user likes content based on detecting user movement related to a tempo, rhythm, lyrics, or melody of a song in accordance with one or more embodiments of the disclosure.

FIG. 4 illustrates a flow diagram for a method 400 determining a user 106 likes content based on detecting user movement related to a tempo, rhythm, lyrics, or melody of a song. User 106 movement may include, but is not limited to, leg, foot, arm, hand, finger, torso, and/or head movement. The movement may also include any combination of the aforementioned items (e.g., dancing). In one embodiment, user 106 movement may be detected by the accelerometer 116. In another embodiment, user 106 movement may be detected by the camera 118. In yet another embodiment, the accelerometer 114 and the camera 116 may be used in conjunction to detect the user's 106 movement. The user device 104 may determine the vocal utterances or movements may correlate or correspond to the characteristics of the song. The characteristics of the song may include, but are not limited to, lyrics, a melody, a tempo, or a rhythm.

At block 402, the user device 104 may determine the user's 106 movement may be related to the song's components (e.g., tempo, melody, etc.). In one embodiment, the user device 104 may include an accelerometer or in communication with an accelerometer 116 that may detect the vibration or movement of the user 106. The accelerometer 116 may detect the change in acceleration of the user 106 that the user device 104 may compare against the song's components. The comparison may include, but is not limited to, the tempo, rhythm, melody, and/or lyrics of the song, as shown in block 406. For example, the user device 104 may correlate the changes in acceleration with the tempo of the song to determine if the user 106 is moving their body in a synchronized way with the tempo. This may include, but is not limited to, the user 106 tapping their foot or hand at the same pace (e.g., beats per minute) as the song. In another instance, the user 106 may be tapping their foot to the rhythm of the song. This may include, but is not limited to, tapping their foot to a drum rhythm or a guitar rhythm of the song. A comparison of the user's 106 movement to the melody and lyrics may also be done to determine whether the user 106 likes the song.

In another embodiment, the user device 104 may receive visual information from a camera 118 that may show the user 106 moving when the song is playing. The user device 104 may use a computer-vision algorithm to determine whether the user's 106 movement is related or similar to one or more of the song's components. This may include, but is not limited to, arm, foot, torso, and/or head movement that is synchronized with one or more components of the song. The user device 104 may also determine when the user 106 is dancing to the song. Therefore, the user device 104 may determine that two or more movements of different parts of the user's 106 body may be moving in conjunction with each other in relation to one or more of the song's components.

In another embodiment, the user device 104 may use the information from both the accelerometer 116 and the camera 118 to determine whether the user's 106 movements are related to the song's components. This user device 104 may correlate the movement data from each detection device to confirm the user's 106 movement or to detect movement that one of the detection devices may have missed.

At block 404, the user device 104 may rank the accuracy, quantity, and/or intensity of the user's movement detected by the accelerometer 116 and/or the camera 118. The accuracy ranking may asses the accuracy of the user's movements at emulating or mimicking the song's components. Hence, the accuracy ranking may be higher when the user's movements are aligned with the song's components. Likewise, the accuracy ranking may be lower when the user's 106 movements are misaligned from the song's components. For example, when the user's 106 foot tapping is consistently aligned with the tempo of the song, the accuracy ranking may be quite high. However, when the user 106 can't hold the tempo, the accuracy ranking will be lower.

As noted above, the quantity ranking is a measurement of how much or how long the user's 106 movements were attempting to emulate or mimic the song. For example, when the user 106 attempts to emulate the tempo of the song for the entire song, the quantity ranking will be higher than for a user 106 that emulated the tempo during the song's choruses. In contrast to accuracy, even when the longer attempt is less accurate than the short attempt, the quantity ranking is higher when the user attempts to emulate the song for a longer period of time.

The intensity of the user's movement may be ranked in at least two ways. In one embodiment, the user device 104 may use information from the accelerometer 116 to rank intensity. In another embodiment, the user device 104 may use information from the camera 118 to rank intensity. In another instance, the user device 104 may use both the accelerometer 114 and the camera 118 to determine an intensity ranking.

The accelerometer 116 may determine the amount of force generated during the changes in acceleration. For example, the changes in acceleration may monitored when the user 106 moves their foot up and when the user 106 move their foot down and makes contact with the floor. In certain instances, when the change in acceleration may be higher when the user 106 makes contact with the floor. In this case, the change in acceleration is more dramatic when the foot hits the floor than when the foot is raised. In certain instances, the user device 104 may use the higher change in acceleration to rank the intensity and/or to determine if the user 106 is attempting to emulate or mimic the components of the song. However, when multiple movements are ongoing, the use device 104 may use the cumulative amount of acceleration to rank the intensity. The cumulative amount may not attempt to segregate the amount of acceleration between moving the foot up and moving the foot down.

The user device 104 may also rank intensity using information from the camera 118. User 106 intensity may be determined by the speed of body movement. The intensity ranking will be higher with the higher speed and lower for the movement at lower speeds. Again, intensity may also be based, at least in part, on the historical intensity rankings for movement using speed or acceleration. When the user 106 exhibits a higher than normal speed or acceleration the intensity ranking may be increased to account for the above average, above median, or an outlier amount of intensity.

In summary, the movement ranking may be based on a combination of the accuracy, quantity, and intensity of the user movements. The ranking may be based on absolute values that when they exceed a threshold amount may be indication that the user 106 likes the song. In another embodiment, the ranking may be based on a user's historical performance for that song or other songs. When the accuracy, quantity, and/or intensity values exceed the historical baseline values, the user device 104 may determine the user likes that song and the ranking may reflect that outlier performance. The historical baseline values may also be based on the location of the user 106 at the time of the performance. Hence, different locations may have different historical values that may be used to determine when the accuracy, quantity, and/or intensity values exceed the historical baseline values or when determining when a performance is an outlier.

Figure 5:
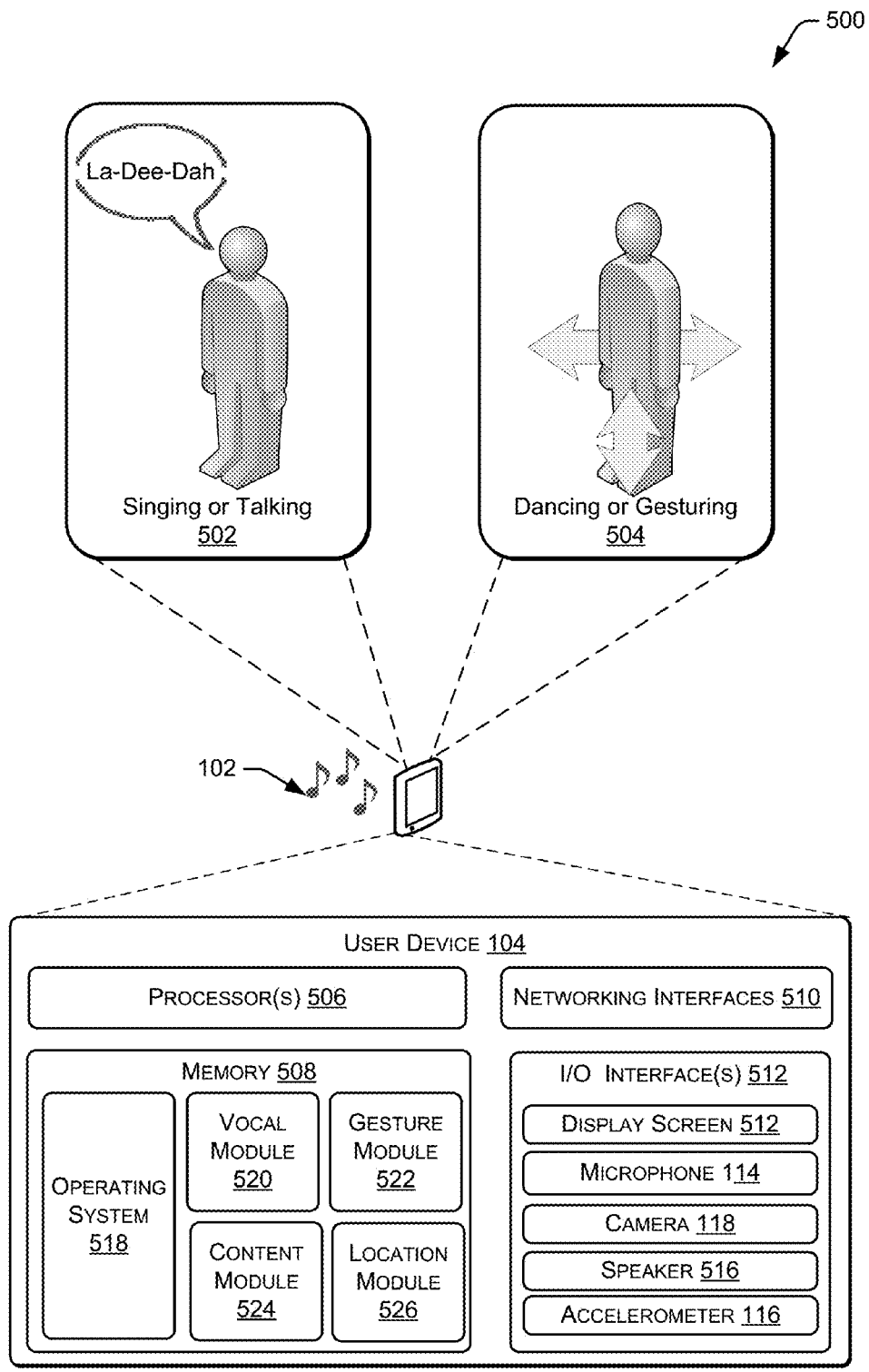
FIG. 5 illustrates a system for determining when a user likes content based on detecting user vocal utterances or user movement in accordance with one or more embodiments of the disclosure.

FIG. 5 illustrates a system 500 for determining that a user 106 likes a song 102 based on detecting user vocal utterances or user movement that is related or similar to the components of the song. The user 106 may try to emulate or mimic the song's components by singing or talking 502 and/or dancing or gesturing 504. The system 500 is shown as a single device 104, but the various features or elements of the user device 104 may be incorporated into two or more devices that may play the song, detect vocal utterances and/or movement, and determine when the vocal utterances and movement are similar to the song 102 being played.

The user device 104 may include one or more processors 506, a memory 508, and one or more network interfaces 510 and input/output interfaces 512 to communicate with the user 106 or another device (not shown) or a cloud network (not shown).

The computer processors 506 may comprise one or more cores and are configured to access and execute (at least in part) computer-readable instructions stored in the one or more memories 508. The one or more computer processors 506 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 104 may also include a chipset (not shown) for controlling communications between the one or more processors 506 and one or more of the other components of the user device 104. In certain embodiments, the user device 104 may be based on an Intel® architecture or an ARM® architecture and the processor(s) 506 and chipset may be from a family of Intel® processors and chipsets. The one or more processors 506 may also include one or more application-specific integrated circuits (ASICs) or application-specific standard products (ASSPs) for handling specific data processing functions or tasks.

The network interfaces 510 may also comprise one or more communication interfaces or network interface devices to provide for the transfer of data between the user device 104 and another device (not shown) via a network (not shown). The communication interfaces may include, but are not limited to: personal area networks ("PANs"), wired local area networks ("LANs"), wireless local area networks ("WLANs"), wireless wide area networks ("WWANs"), and so forth. In FIG. 5, the provider device is coupled to the network via a wired connection. However, the wireless system interfaces may include the hardware and software to broadcast and receive messages either using the Wi-Fi Direct Standard (See; Wi-Fi Direct specification published in October 2010) and or the IEEE 802.11 wireless standard (See; IEEE 802.11-2007, published Mar. 8, 2007; IEEE 802.11n-2009, published October 2009) or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical or other signals to exchange data between the user device 104 and another device such as an access point, a host computer, a server, a router, a reader device, and the like. The network may include, but is not limited to: the Internet, a private network, a virtual private network, a wireless wide area network, a local area network, a metropolitan area network, a telephone network, and so forth.

The input/output interfaces 512 may include, but are not limited to, a display screen 514, a microphone 114, a camera 118, a speaker 516, and accelerometer 116. In other embodiments, the input/output interfaces 512 may further include keyboards, a mouse, and/or a joy stick. The display screen 514 may include, but is not limited to, liquid crystal display or a touch screen display that enables the user 106 to interface with the user device 104. As noted above in FIG. 1, the microphone 114 may collect audio signals near the user device 104, the camera 118 may capture images of the user 106, and the accelerometer 116 may detect the user's 106 movements. The user device 104 may also include a speaker 516 to play the song 102 for the user 106.

The one or more memories 508 comprise one or more computer-readable storage media ("CRSM"). In some embodiments, the one or more memories 508 may include non-transitory media such as random access memory ("RAM"), flash RAM, magnetic media, optical media, solid state media, and so forth. The one or more memories 508 may be volatile (in that information is retained while providing power) or non-volatile (in that information is retained without providing power.) Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 508 may store an operating system 518 that includes a plurality of computer-executable instructions that may be implemented by the processor 506 to perform a variety of tasks to operate the interface(s) 510, 512 and any other hardware installed on the user device 104. The memory 508 may also include a vocal module 520, a gesture module 522, a content module 524, a location module 526.

The vocal module 520 may determine when vocal utterances are related to the components of the song 102 as discussed above in FIGS. 1-3. The vocal utterances may take many forms that may include, but are not limited to, singing, speaking, humming, whistling, and/or vocal percussion. The microphone 114 may provide the audio information to the vocal module 520 that compares the audio information against the tempo, melody, rhythm, and/or lyrics of the song. The comparison may determine the accuracy, quantity, and intensity of the vocal utterances as described above in the description of FIGS. 1-3. The vocal module 520 may rank the comparisons to determine how much the user 106 likes the song. When the ranking exceeds a threshold amount, the vocal module 520 may designate the user 106 likes the song and may select another song from the same artist, genre, tempo, and/or rhythm to play for the user 106.

The gesture module 522, may determine when user movements are related to the components of the song 102 as discussed above in FIG. 4. As noted above, the gestures or user movements may include, but are not limited to, moving arms, hands, legs, torso, feet, and/or a head either by themselves or in a combination thereof. User 106 movement information may be sent to the gesture module 522 from the accelerometer 116 and/or the camera 118. The gesture module 522 may compare the motion information to the song's components (e.g., tempo, melody, etc.) to determine when the user 106 may be emulating or being responsive to the song. The comparison may also determine the accuracy, quantity, and intensity of the user's 106 movements as described in the description of FIG. 4. The gesture module 522 may rank the comparisons to determine how much the user 106 likes the song. When the ranking exceeds a threshold amount, the gesture module 522 may designate the user 106 likes the song and may select another song that is related to the song and to play the other song for the user 106.

The gesture module 522 may use information from the accelerometer that measures the force or acceleration of the user's movements. The gesture module 522 may also use a plurality of images captured by the camera to determine the user's movements. The gesture module 522 may measure the distance of the user's movement based on the movement captured between two or more images. In one specific embodiment, the camera detected movements may be referred to as image movements and the accelerometer detected movements may be referred to as movements.

The content module 524 may store the songs that are played by the user device 104. The songs may be arranged by artist, genre, tempo, melody, and/or rhythm. When the user device 104 determines that the user 106 likes a song and wants to play a similar song after the user finishes listening to other song. The content module 524 may determine the next song based, at least in part, on the artist, genre, tempo, melody, and/or rhythm of the song was deemed as "liked" by the user based on their vocal utterances or movements.

The location module 524 may determine the location of the user device 104 using any location technique that may include, but is not limited to, triangulation by satellite, cellular base station, wireless network access point, or any other device that may be used to determine the location of the user device 104.

Figure 6:
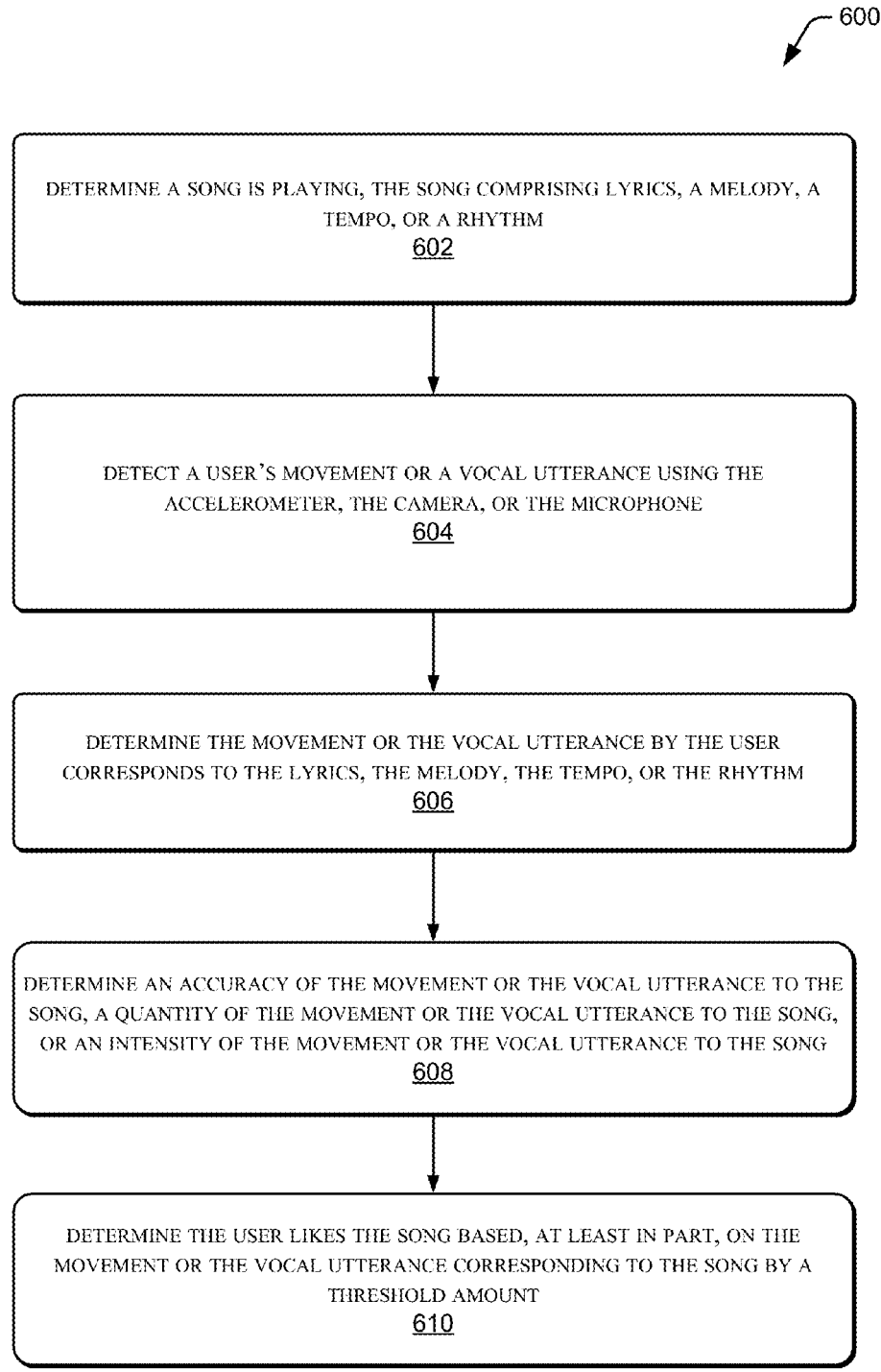
FIG. 6 illustrates a flow diagram for a method for determining when a user likes content based on detecting user vocal utterances or user movement in accordance with one or more embodiments of the disclosure.

FIG. 6 illustrates a flow diagram for a method 600 for determining when a user 106 likes content based on detecting user 106 vocal utterances or user 106 movements. The user device 104 may determine which song the user 106 likes based, at least in part, on the vocal utterances and/or movements that are detected by the user device 104. The method 600 illustrates one embodiment of the user device 104 and that in other embodiments the sequencing of the method 600 may be altered and some steps may be omitted.

At block 602, the user device 104 may determine a song is playing either by the user device 104 or another device. Broadly, songs may include, but are not limited to, lyrics, a melody, a tempo, and/or a rhythm. In one embodiment, the lyrics may include, but are not limited to, one or more words that are sung or spoken in the song. In certain instances, the lyrics may be arranged into a vocal melody that may be an arrangement of tones in which the words are sung or spoken.

The melody may include, but is not limited to, the vocal melody or an instrumental melody that may include an arrangement of tones that are generated by one or more instruments. The melody may repeat in pattern throughout the sing with through vocals (e.g., chorus) or through instruments. In one specific embodiment, the song may be constructed to include an arrangement of choruses and verses that may contain their respective melodies. In certain instances, the choruses and verses may contain their own tempo, rhythm, and lyrics. However, in certain songs, the melodies may contain a virtuoso quality, in that a particular vocalist or instrument that creates their own melody within the context (e.g., guitar solo, a cappella vocal, etc.) of the song. During these portions, the song may include several melodies at the same time and the user may attempt to emulate at least one of the melodies. The user device 104 may be able to discern the difference between the different melodies.

The tempo of a song may be referred to a as the pace of the song. The pace being a steady pulse that the vocalists and instrumentalists follow together when the song is performed. In one embodiment, the tempo may be measured in beats per minute (bpm) and is one indication of how fast or how slow the song is being played. The tempo may be referenced as a string of pulses that are equidistant in time between each other. In one instance, the tempo may be a strong candidate for users to express their interest in the song by tapping the tempo of the song with their foot or hand.

A song may include several rhythms that are being implemented by the vocalist and instrumentalists; in fact the instrumentalists may be playing different rhythms within the song. Generally, the rhythm of the song may be referred to as the beat of the song or the beat of an instrument or vocal. In contrast to tempo, the rhythm may fluctuate or have an ebb and flow and may not be evenly spaced beats or pulses that are equidistant in time from each other. In general, the rhythm may be arrangement of tones like a melody; however the rhythm may have a more percussive feel or implementation than a melody and may not include different tones that form a melody. In one specific embodiment, the rhythm may be implemented by the drums or bass guitar; however rhythms are not limited to those two types of instruments. For example, a rhythm may be used in multiple songs with different melodies or lyrics placed on top of the rhythm. One famous rhythm is the "Bo Diddley Beat" which is a clave rhythm with roots in Afro-Cuban music.

At block 604, the user device 104 may detect the movement or the vocal utterance of the user 106 based, at least in part, on the microphone 114, the accelerometer 116, and/or the camera 118. As noted above in the descriptions of FIGS. 1-3, the microphone 114 may detect any vocal utterances generated by the user 106. The accelerometer 116 and/or the camera 118 may detect the user's 106 movement as described in the description of FIG. 4.

At block 608, the user device 104 may determine the movement or the vocal utterance by the user is an attempt to correspond to the song (e.g., the lyrics, the melody, the tempo, and/or the rhythm). In one embodiment, the vocal utterance by the user 106 may be determined to be corresponding to the lyrics based, at least in part, on the vocal utterance comprising one or more words spoken or sung by the user 106 are corresponding to the lyrics to within a threshold amount. In another embodiment, the vocal utterance comprising a vocal sound (e.g., humming or whistling) by the user that corresponds to the vocal melody to within another threshold amount. In one embodiment, the threshold amount may be referred to as the lyric threshold amount.

In one embodiment, the vocal utterances may be corresponding to the melody based, at least in part, on using a tone comparison algorithm that analyzes the tone of the vocal utterance and compares the vocal utterance to the tones in the melody. The correspondence may attempt to determine the tone for tone accuracy, but does not require having an exact tone for tone match to indicate the user is corresponding or responding to the melody. For example, the melody may exhibit a tone pattern that the tone comparison algorithm may use to detect a similar pattern within the vocal utterance. Accordingly, the vocal utterance may not be in tune with the melody, but the tone pattern may be similar with regard to the relative differences between the tones. For example, when the vocal utterance has a pattern of tones in a descending arrangement, the tone comparison algorithm may indicate correspondence occurs when the melody also has a descending arrangement. Although the tones between the vocal utterance and the melody may not exactly match, the tone comparison algorithm may determine correspondence occurs when the vocal utterance tones are within a threshold amount of the melody. In one specific embodiment, threshold amount may include a measure of tone difference such as flat or sharp. In other embodiments, the tone difference may be greater than a fourth or an octave difference between the vocal utterance tones and the melody tones.

In another embodiment, the user device 104 may determine the user 106 is corresponding to the melody based, at least in part, on the vocal utterance comprising a vocal sound by the user 106 that corresponds to the instrumental melody to within a threshold amount. In this case, the melody may be played by an instrument rather than by a vocalist or singer. In one embodiment, the vocal sound may be singing, but in other embodiments the vocal sound may also be humming, whistling, or the like. In one specific embodiment, the vocal sound may be an attempt to mimic the tonal quality of the instrumental melody. For example, the vocal sound may include an attempt to correspond to, emulate, or mimic an electric guitar with heavy distortion. Again, the correspondence may not need to be an exact match and may be within a threshold amount as described above in the previous embodiment. In one embodiment, the threshold amount may be referred to as the melody threshold amount.

In another embodiment, the user device 104 may determine the user 106 is emulating or mimicking the tempo based, at least in part, on the vocal utterance comprising a vocal sound that correlates to the tempo to within a threshold amount. In this instance, the user 106 may be using their voice or mouth to emulate or mimic the tempo for the song. The user device 104 may use a tempo comparison algorithm to determine when the user 106 is corresponding to the tempo. Again, the correspondence determination is based, at least in part, on a threshold amount in which the vocal utterance may exceed or meet and may not require the tempo vocal utterance to be an exact match of the tempo.

In another embodiment, the user device 104 may determine the user 106 is emulating or mimicking the rhythm based, at least in part, on the vocal utterance comprising a vocal sound by the user 106 that correlates to the rhythm to within a threshold amount. The rhythm may be a vocal rhythm or an instrumental rhythm. The user device 104 may be monitoring multiple rhythms within the song and may compare the vocal utterance against one or more of the rhythms. The user device 104 may use a rhythm comparison algorithm to compare the vocal utterance against the one or more rhythms of the song.

Again, the vocal utterance may not need to exact to be deemed an emulation or correspondence; rather the threshold amount concept described above also applies in this embodiment. In one embodiment, the threshold amount may be referred to as the rhythm threshold amount.

The user device 104 may also receive user movement information from various detection devices (e.g., accelerometer 116). The movement information may be analyzed by a movement comparison algorithm that may determine when the user's 106 movements are an attempt to emulate or correspond to one or more components of a song. As noted above in the description of FIG. 4, the user device 104 may user the acceleration information or the visual information to determine when the user 106 is emulating or corresponding to the lyrics, melody, tempo, and/or rhythm to within a threshold amount. In one embodiment, the threshold amount may be referred to as the movement threshold amount.

At block 608, the user device 104 may determine a user's 106 accuracy of the emulation to the song, a quantity of the emulation to the song, and/or an intensity of the emulation to the song. The accuracy, quantity, or intensity rankings may be used individually or collectively to determine whether a user 106 likes the song. The user device 104 may set a threshold amount for each ranking criteria, when that threshold amount is achieved the user device 104 may determine that the user 106 likes the song. For example, when the threshold amount may be set to 30% for each criteria. When the user 106 exceeds a 30% for any criteria, the user device 104 may determine that the user 106 likes the song and may select a similar song to play after the "liked" song finishes playing. In another embodiment, the user device 104 may use two thresholds instead of one threshold. The first threshold at 30% may indicate the user 106 likes the song but the user device 104 may not select a similar song to play unless the second threshold is achieved. For example, when the second threshold is 50%, the user device 104 may only indicate the user 106 likes the song when the ranking criteria are between 30% and 49%. However, when the ranking is 50% or greater, the user device 104 may select a similar song to play after the current song finishes playing.

In another embodiment, the user device 106 may determine a threshold amount that includes the ranking of two or more of the criteria instead of just a single criterion. Hence, the "like" determination may be based on accuracy and quantity, quantity and intensity, accuracy and intensity, or accuracy, quantity, and intensity. For example, the threshold amount may include a cumulative value that may be achieved by adding up the rankings for each criterion. When the threshold amount is 50%, any time the sum of the rankings exceeds 50% the song may be deemed as "liked." In another embodiment, the individual rankings may have to exceed their own threshold amount in order for the song to be deemed "liked." For example, in one specific embodiment, the threshold for accuracy may be 20% and quantity may be 60%. Accordingly, the ranking for each of the criteria should be achieved to have the song be deemed as "liked." When quantity may be ranked at 80% and accuracy may be ranked at 10%, the song may not be deemed as "liked." However, in certain instances, the individual rankings may overrule the collective ranking rules. For example, in one specific embodiment, under the collective thresholds in the previous example (e.g., accuracy @20% and quantity @60%), when the quantity ranking may be greater than 85% and the accuracy may be 10%, the user device 106 may overrule the collective ranking requirements (e.g., accuracy @20% and quantity @60%) and deem the song as "liked." This overruling feature may apply to any ranking criteria and the threshold amounts may vary to any values or arrangements as desired.

The accuracy criteria may be an indication or measurement of how accurate the user's 106 performance is corresponding to the song. In one embodiment, the accuracy may be a measure of how much the user's 106 performance corresponds to or is similar to the song. This performance may include a correspondence of one or more of the following: the lyrics, the tempo, the melody, and/or the rhythm. The performance may include, but is not limited to, the user's 106 vocal utterances and/or movements. The accuracy ranking may reflect the amount of the vocal utterances and/or movements that correspond to the song. For example, when the user may sing each of the choruses correctly, the accuracy ranking may be 100%. In contrast to the quantity ranking, this may be 30%, since the user 106 may have just sung the choruses and not the verses. When the user sings or attempts to sing the entire song, the quantity ranking may be 100%. In summary, the accuracy may be an indication of what the user 106 accurately emulated or mimicked the song and the quantity may be an indication of how much of the song the user 106 attempted to emulate or mimic.

The intensity ranking criteria may also be based, at least in part, on a percentage ranking. However, in another embodiment, the intensity may also be ranked based on a decibel level for vocal utterances and the amount of force or acceleration of the user's 106 movements. The decibel level may be determined by the vocal utterances captured by the microphone and the force or acceleration information may be captured by the accelerometer 116 and/or the camera 118. In another embodiment, the camera 118 may also capture the distance traveled by the user 106 and the amount of time to travel that distance. The user device 104 may determine the speed or acceleration of the user 106 using the distance and time information captured by the camera 118. The acceleration and/or speed may be used to determine an intensity ranking for the user's 106 movement.

At block 610, the user device 104 may determine the user 106 likes the song based, at least in part, on vocal utterances and the movements corresponding to the components of the song. In another embodiment, the like determination may also be based, at least in part, on the accuracy, the quantity, and/or the intensity of the movement or the vocal utterance by the user 106. The like threshold may be an amount set by the user 106 or an administrator (e.g., device manufacturer, software provider, etc.) for the user device 104. The like threshold may include a threshold amount for each of the criteria (e.g., accuracy, quantity, intensity) that when the user exceeds or meets the threshold amount the song is designated as liked. However, the user device 104 may use a combination of two or more of the criterion to like a song. In one specific embodiment, the individual criterion thresholds may be set relatively high and the user 106 may exceed that threshold for one criterion. However, a combination threshold may be set to that a cumulative score of two or more criteria may also designate a song as liked. For example, the individual thresholds may be set at 70% for each criterion, such that when any one criterion exceeds that amount the song receives the like designation. However, a combination threshold may include a cumulative score of two or more criterion. For example, the combination threshold may be 80% and when the rankings of two or more criterion exceed 80% (e.g., accuracy 45%, quantity 55%) the song may receive the like designation.

In another embodiment, other combination thresholds may be set that when two or more of the criteria exceed a threshold the song may be designated as liked. For example, the single criterion threshold may be set at 70%, but this combination threshold may be set that when two or more criteria both exceed 45% the song may be assigned the like designation.

In another embodiment, the threshold amount for a liked song may include any combination of the individual threshold amounts for corresponding to the one or more lyrics, tempos, melodies, or rhythms of the song and/or the accuracy, quantity, and/or intensity thresholds for the user 106.

In one embodiment, another song may be selected to be played when the song is designated as liked. The song selection may be based, at least in part, on artist, genre, song tempo, or song rhythm or any other technique that may designate the other song as related to or associated with the liked song. For example, this may be based on user purchases, browsing history, recommendations, and/or purchases or recommendations made by other users.

Although the above criteria rankings are shown as percentages, the user device 104 may use any other ranking system that may indicate relative ranking between the criteria or within the criteria to indicate a higher amount or a lower amount. This may include any numbering, letter, or color ranking system that may be used to differentiate between user's 106 performances.

Figure 7:
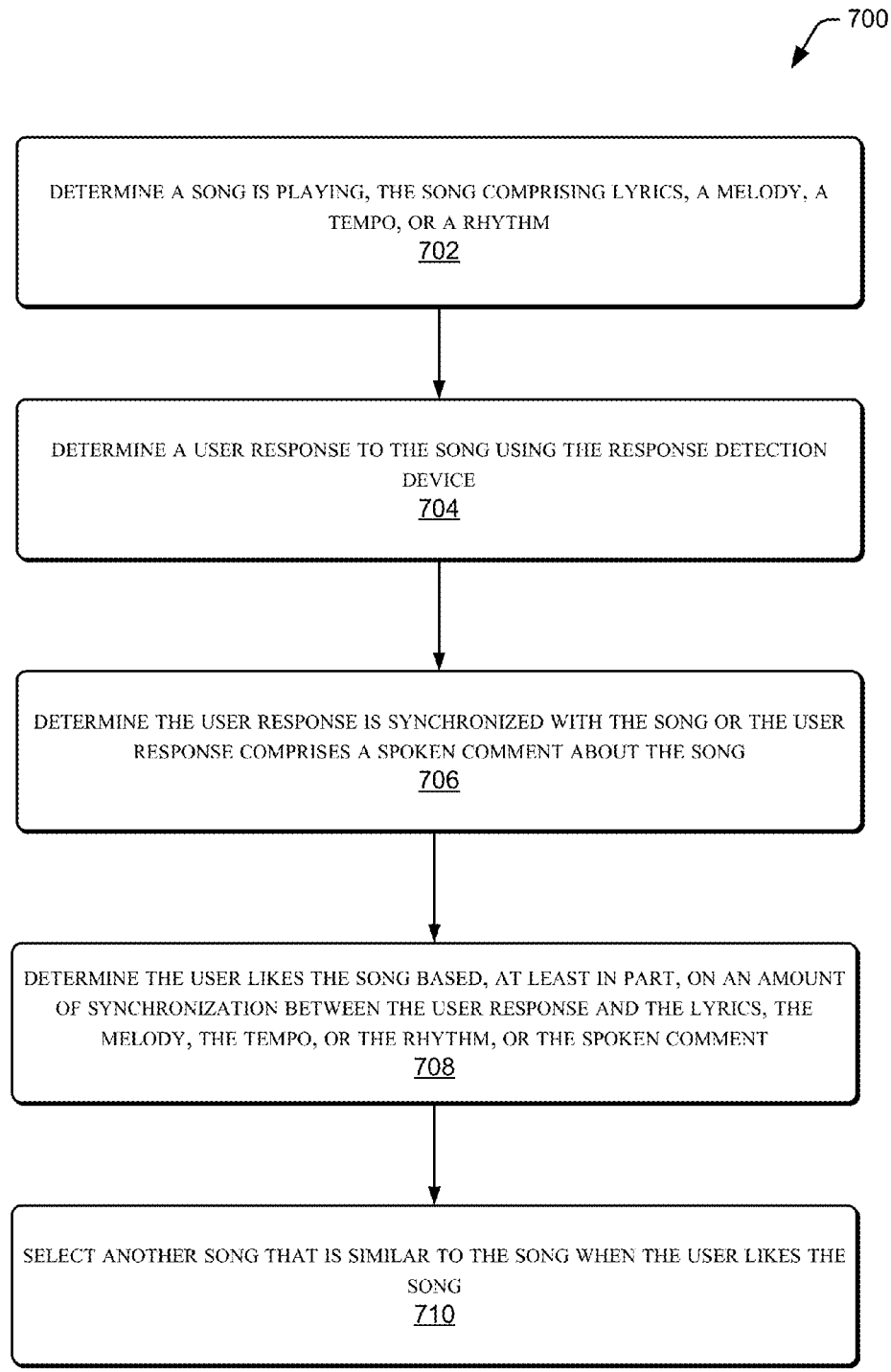
FIG. 7 illustrates a flow diagram for another method for determining when a user likes content based on detecting user vocal utterances or user movement in accordance with one or more embodiments of the disclosure.

FIG. 7 illustrates a flow diagram for another method 700 for determining when a user 106 likes a song based on detecting user 106 vocal utterances or user 106 movements. The method 700 illustrates one embodiment and that in other embodiments the sequencing of the method 700 may be altered and some steps may be omitted.

At block 702, the user device 104 may determine a song is playing using a speaker 516. The song may comprise lyrics, a melody, a tempo, and/or a rhythm that are arranged together to form the song. In another embodiment, the song may be played through earphones that are coupled to the user device 104. In another embodiment, the song may be played by another device that may or may not be coupled to the user device 104.

At block 704, the user device 104 may determine a user response to the song using a response detection device. The user response may include, but is not limited to, user 106 vocal utterances or user 106 movements. The response detection device may include, but is not limited to, a microphone 114, an accelerometer 116, and/or a camera 118. In other embodiments, the response detection device may be a sensor capable of capturing and/or determining a physical or emotional response from the user 106.

At block 706, the user device 104 may determine the user response is synchronized with the song's components. The synchronization may include a user response that is synchronized in timing with the song's components. The timing synchronization may include any user responses that are keeping time with the song's tempo, rhythm, and/or melody. For example, the timing synchronization may include, but is not limited to, tapping a foot, snapping fingers, or head bobbing that is in time with the song's components.

In another embodiment, the user device 104 may determine the user response comprises a spoken comment about the song. The spoken comment may include, but is not limited to, "I like this song" or the like. The spoken comment may in a natural language format with words that clearly indicate the user's 106 interest in the song similar to "this song rocks." However, in other embodiments, the spoken comment may be an expression of emotion similar to "yeah," "woo-hoo," or other emotive comments vocalized by the user 104. The spoken comments may not be synchronized to the song's components and may be of a spontaneous nature in timing and duration.

At block 708, the user device 104 may determine the user 106 likes the song based, at least in part, on an amount of synchronization between the user response and the lyrics, the melody, the tempo, or the rhythm; or the spoken comment. Synchronization for the lyrics may include, but is not limited to, determining the words being spoken or sung by the user 106 are similar in content to the words being used in the song. The user device 104 may also determine how long the user 106 attempts to synchronize with the lyrics. In one embodiment, the user device 104 may determine the user likes the song based on the how well the user 106 synchronizes with the song and/or how long the user 106 attempts to synchronize with the lyrics of the song.

The user device 104 may also determine when the user response attempts to synchronizes with the tempo, melody, and/or rhythm of the song. Again, the user device 104 may determine how synchronized the user response may be with each component, but may also determine how long the user 106 attempts or is successful in synchronizing with one or more components of the song.

Generally, the amount of synchronization may exceed, meet, or achieve a threshold amount for the user device 104 to determine the user 106 likes the song. In certain instances, each component may have their own threshold amount to receive a like designation. However, in other instances, the user device 104 may determine a song is liked based on a combination of the user responses to one or more of the song's components. The threshold amounts may be represented by a ranking or weighting system that distinguishes between a lower amount and a higher amount. This may include percentages, numbering, lettering, color coding, or any other ranking scheme.

At block 710, the user device 104 may select another song to play when the one of the songs has been designated as liked based, at least in part, on the user's response. The other song may be by the same artist, genre, tempo, or rhythm as the liked song or any other song that is related to or associated with the liked song by any means.

Figure 8:
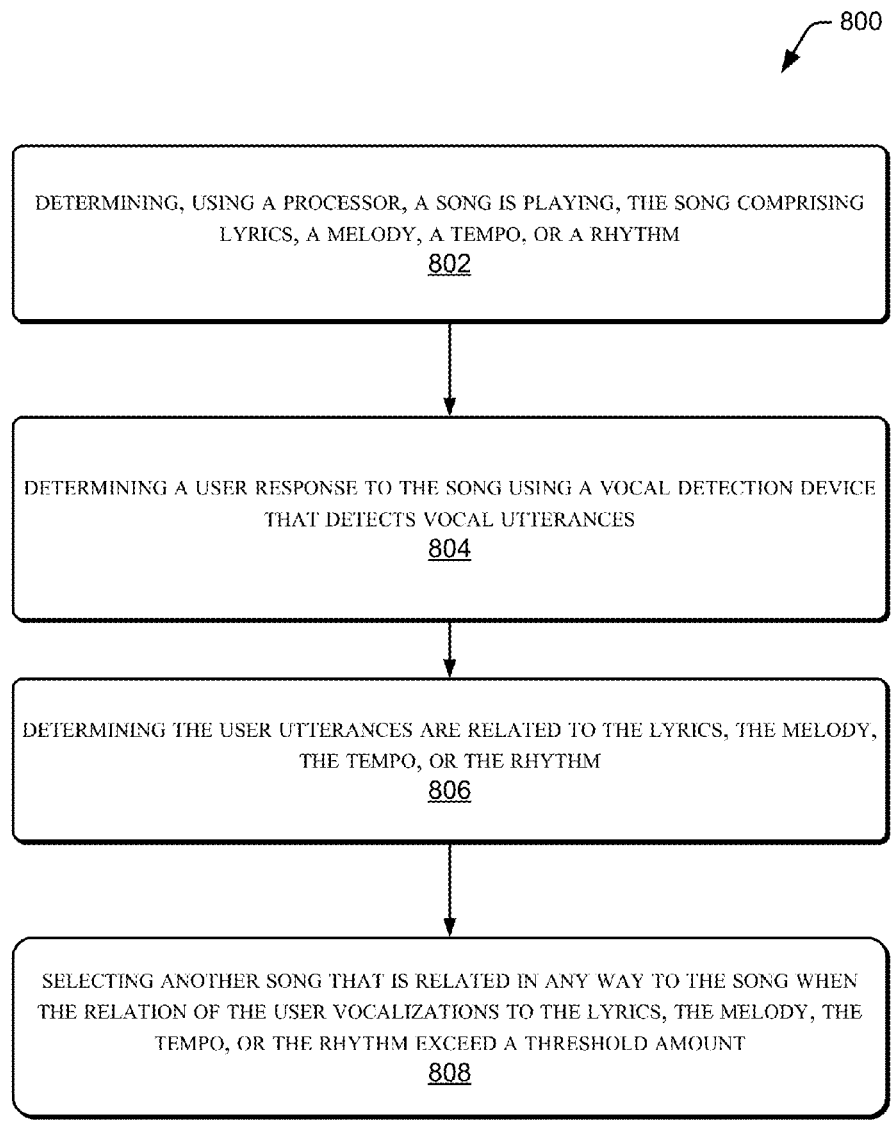
FIG. 8 illustrates a flow diagram for determining when a user likes content based on detecting user vocal utterances in accordance with one or more embodiments of the disclosure.

FIG. 8 illustrates a flow diagram for method 800 for determining when a user likes a song based on detecting user vocal utterances that complete at least a portion of the song's lyrics or melodies. The song may include, but is not limited to, a chorus and/or one or more verses. The like designation may be based on how much of the chorus and/or the verse is emulated by the user 106. The method 800 illustrates one embodiment and that in other embodiments the sequencing of the method 800 may be altered and some steps may be omitted.

At block 802, the user device 104 may determine a song is playing and that the song includes, but is not limited to, lyrics, a melody, a tempo, and/or a rhythm.

At block 804, the user device 104 may determine a user 106 response to the song using a vocal detection device that detects user 106 vocal utterances. The user 106 vocal utterances may include, but are not limited to, singing, speaking, humming, and/or vocal percussion. This may include a user 106 talking or speaking about the song. For example, the user 106 may make a comment that indicates they like the song. The positive comment may include, but is not limited to, "I like this song" or "This song rocks."

At block 806, the user device 104 may determine the user 106 vocal utterances are related to the lyrics or a melody associated with the lyrics or a tempo, and/or a rhythm. The song may include but is not limited to, a chorus and/or one or more verses. In one embodiment, the chorus is a portion of a song that highlights the main theme of the song and may be repeated several times within the song. In one instance, the chorus may be played between one or more verses of the song. The verse is another portion of the song that includes words arranged to a melody. The verse may include a melody that is different than the chorus and may include more words than the chorus. The verse may include content that relates to the main theme expressed in the chorus and in some instances set the foundation for the introduction of the chorus.

The user device 104 may identify the chorus and the verses within a song. The user device 104 may determine when the user is vocalizing a chorus of the song, the verses of the song or a combination thereof. In certain instances, the user device 104 may indicate the user 106 likes the song when the user emulates the entire chorus, an entire verse, or a combination thereof.

At block 808, the user device 104 may select another song comprising an artist, a genre, a tempo, or a rhythm that is similar to the liked song when the user 106 vocalizes at least a threshold amount of the song. In one instance, threshold amount may include the number of times the user 106 emulated or mimicked the chorus or a verse. For example, the like threshold may be when the user 106 emulates or mimics each chorus portion of the song. In another instance, the like threshold may include singing at least one chorus of the song. This same like threshold may include the user 106 emulating or mimicking one or more verses of the song. In one specific instance, the like threshold may include the user 106 singing at least two verses of the song.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
   at least one memory comprising computer-executable instructions and one or more songs;
   at least one accelerometer to detect movement by a user;
   at least one camera to capture a plurality of images of the user, the plurality of images used to detect an image movement by the user, wherein the image movement is movement detected by the at least one camera;
   at least one microphone to detect a vocal utterance by the user;
   at least one processor configured to execute the computer-executable instructions to:
   determine a song is playing, the song comprising lyrics, a melody, a tempo, or a rhythm;
   detect the movement, the image movement, or the vocal utterance of the user based, at least in part, on the accelerometer, the camera, or the microphone;

determine that the movement, the image movement, or the vocal utterance by the user is synchronized in timing with one or more of the lyrics, the melody, the tempo, or the rhythm;

determine a synchronization amount based, at least in part, on timing synchronization of one or more of the movement, the image movement, or the vocal utterance by the user with one or more of the lyrics, the melody, the tempo, or the rhythm; and determine that the user likes the song based, at least in part, on a determination that the synchronization amount exceeds a synchronization threshold amount.

2. The system of claim 1, wherein the lyrics comprise one or more words that are sung or spoken in the song and the words are arranged into a vocal melody, and wherein determining that the user likes the song comprises determining that the vocal utterance by the user corresponds to the lyrics based, at least in part, on the vocal utterance comprising one or more words spoken or sung by the user correspond to the lyrics to within a lyric threshold amount or a vocal sound by the user that corresponds to the vocal melody to within another lyric threshold amount.

3. The system of claim 1, wherein:
the movement comprises leg movement, arm movement, torso movement, or head movement; and
the image movement comprises the leg movement, the arm movement, the torso movement, or the head movement.

4. The system of claim 1, wherein the melody comprises instrumental tones arranged in a pattern, and wherein determining that the user likes the song comprises determining that the vocal utterance by the user corresponds to the melody based, at least in part, on the vocal utterance comprising a vocal sound by the user that corresponds to the melody to within a melody threshold amount.

5. The system of claim 1, wherein the tempo comprises a pace of the song measured in a unit of time, and wherein determining that the user likes the song comprises determining that the vocal utterance by the user corresponds to the tempo based, at least in part, on the vocal utterance comprising a vocal sound by the user that corresponds to the tempo to within a tempo threshold amount.

6. The system of claim 1, wherein the rhythm comprises a patterned reoccurrence of a beat within the song, and wherein determining that the user likes the song comprises determining that the vocal utterance by the user corresponds to the rhythm based, at least in part, on the vocal utterance comprising a vocal sound by the user that corresponds to the rhythm within a rhythm threshold amount.

7. The system of claim 1, wherein determining that the user likes the song comprises determining that the movement by the user corresponds to the tempo based, at least in part, on the movement or the image movement corresponding to the tempo to within a tempo movement threshold amount.

8. The system of claim 1, wherein determining that the user likes the song comprises determining that the movement or the image movement by the user corresponds to the rhythm based, at least in part, on the movement or the image movement corresponding to the rhythm to within a rhythm movement threshold amount.

9. The system of claim 1, further comprising computer-executable instructions to determine an accuracy of the correspondence to the song, a quantity of the correspondence to the song, or an intensity of the correspondence to the song.

10. The system of claim 9, wherein the accuracy for the vocal utterance is based, at least in part, on one or more words that are spoken or sung in the song that correspond to the vocal utterance by the user.

11. The system of claim 9, wherein the quantity of the vocal utterance is based, at least in part, on an amount of words that are spoken or sung in the song that correspond to the vocal utterance by the user.

12. The system of claim 9, wherein the intensity of the vocal utterance is based, at least in part, on a decibel level of the vocal utterance by the user.

13. The system of claim 9, wherein the accuracy for the movement or the image movement is based, at least in part, on, the movement or the image movement corresponding to the tempo or the rhythm.

14. The system of claim 1 wherein the quantity of the movement or the image movement is based, at least in part, on how long the movement or the image movement corresponds to the tempo or the rhythm.

15. The system of claim 9, wherein the intensity of the movement is based, at least in part, on an amount of force measured by the accelerometer during the movement or the intensity of the image movement is based, at least in part, on an amount of movement detected in the plurality of images.

16. The system of claim 1, further comprising the computer-executable instructions to select another song that is similar to the song based, at least in part, on artist, genre, song tempo, or song rhythm when the accuracy, quantity, or intensity determinations exceed a ranking threshold amount.

17. A system, comprising:
at least one memory comprising computer-executable instructions and one or more songs;
at least one response detection device to detect sound or movement generated by a user;
at least one processor configured to execute the computer-executable instructions to:
determine a song is playing;
determine a user response to the song based, at least in part, on analysis of information obtained from the response detection device;
determine that the user response is synchronized in timing with one or more components of the song; and
determine the user likes the song based, at least in part, on an amount of synchronization between the user response and one or more audio characteristics associated with the song.

18. The system of claim 17, wherein the audio characteristics associated with the song comprising lyrics, a melody, a tempo, or a rhythm.

19. The system of claim 17, wherein the amount of synchronization is based, at least in part, on the user vocalizing the lyrics of the song for at least a threshold amount.

20. The system of claim 17, wherein the amount of synchronization is based, at least in part, on:
the user vocalizing at the tempo of the song for at least a threshold amount, or
moving a body part at the tempo of the song for at least another threshold amount.

21. The system of claim 17, wherein the amount of synchronization is based, at least in part, on:
the user vocalizing the rhythm of the song for at least a threshold amount, or
the user moving a body part at the rhythm of the song for at least another threshold amount.

22. The system of claim 17, wherein the amount of synchronization is based, at least in part, on:
the user vocalizing the melody of the song for at least a threshold amount; or
the user moving a body part to the rhythm of the song for at least another threshold amount.

23. The system of claim 17, wherein the response detection device comprises a microphone, an accelerometer, or a camera.

24. The system of claim 17, wherein the user liking the song further comprises determining an intensity of the user response, the intensity being measured in decibels by the microphone, force by the accelerometer, or the user's body movement measured by the camera.

25. The system of claim 17, further comprising computer-executable instructions to select another song that is similar to the song when the user likes the song.

26. A method comprising:
   determining, using a processor, a song is playing, the song comprising lyrics, a melody, a tempo, or a rhythm;
   determining a user response to the song using a vocal detection device that detects user vocal utterances;
   determining the user vocal utterances are synchronized in timing with the melody, the tempo, or the rhythm;
   determining a synchronization amount based, at least in part, on timing synchronization of the user vocal utterances with one or more of the melody, the tempo, or the rhythm; and
   selecting, in response to determining that the synchronization amount exceeds a synchronization threshold amount, another song that is similar to the song.

27. The method of claim 26, wherein the user vocal utterances comprise singing, speaking, humming, or vocal percussion.

28. The method of claim 26, wherein the speaking comprises an indication of a positive comment about the song.

29. The method of claim 26, wherein the user vocal utterances are based, at least in part, on:
   determining the user is vocalizing a chorus of the song;
   determining the user is vocalizing a verse of the song; or
   determining the user is vocalizing the chorus and the verse of the song.

30. The method of claim 29, wherein exceeding the threshold amount is based, at least in part, on the user vocal utterances comprising the chorus or the verse of the song.

31. One or more non-transitory computer-readable media storing computer-executable instructions that, when executed by at least one processor, configure the at least one processor to perform operations comprising:
   determining, using a processor, a song is playing, the song comprising lyrics, a melody, a tempo, or a rhythm;
   determining a user response to the song using a motion detection device that detects user movements;
   determining the user movements are synchronized in timing with the lyrics, the melody, the tempo, or the rhythm by at least a threshold amount;
   determining a synchronization amount based, at least in part, on timing synchronization of the user movements with one or more of the lyrics, the melody, the tempo, or the rhythm; and
   selecting, in response to determining that the synchronization amount exceeds a synchronization threshold amount, another song that is similar to the song.

* * * * *